United States Patent
Thomas et al.

(10) Patent No.: US 8,800,052 B2
(45) Date of Patent: Aug. 5, 2014

(54) TIMER FOR HARDWARE PROTECTION OF VIRTUAL MACHINE MONITOR RUNTIME INTEGRITY WATCHER

(75) Inventors: Brent Thomas, Chandler, AZ (US); Shamanna Datta, Hillsboro, OR (US); Scott Durrant, Hillsboro, OR (US); Alberto Munoz, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/539,299

(22) Filed: Jun. 29, 2012

(65) Prior Publication Data

US 2014/0007248 A1    Jan. 2, 2014

(51) Int. Cl.
    *G06F 21/00*    (2013.01)
    *G06F 9/455*    (2006.01)
(52) U.S. Cl.
    CPC .................................. *G06F 9/45533* (2013.01)
    USPC .............................. 726/26; 726/25; 713/187
(58) Field of Classification Search
    CPC ......... G06F 21/00; G06F 21/05; G06F 21/70; G06F 21/72; G06F 21/725; G06F 9/455; G06F 9/45533
    USPC .......................................................... 726/26
    See application file for complete search history.

(56) References Cited

U.S. PATENT DOCUMENTS

| | | | |
|---|---|---|---|
| 2008/0244573 A1 | 10/2008 | Sahita et al. | |
| 2008/0250406 A1 | 10/2008 | Carpenter et al. | |
| 2009/0044265 A1 | 2/2009 | Ghosh et al. | |
| 2009/0164770 A1* | 6/2009 | Zimmer et al. | 713/2 |
| 2011/0145598 A1* | 6/2011 | Smith et al. | 713/190 |
| 2012/0297057 A1* | 11/2012 | Ghosh et al. | 709/224 |
| 2013/0275980 A1 | 10/2013 | Datta et al. | |

FOREIGN PATENT DOCUMENTS

| | | |
|---|---|---|
| WO | 2011/076464 A1 | 6/2011 |
| WO | 2014/004212 A1 | 1/2014 |

OTHER PUBLICATIONS

International Search Report and Written Opinion received for PCT Application No. PCT/US2013/046573, mailed on Oct. 17, 2013, 11 Pages.

\* cited by examiner

*Primary Examiner* — Yogesh Paliwal
(74) *Attorney, Agent, or Firm* — Thomas R. Lane

(57) ABSTRACT

An apparatus and method for hardware protection of a virtual machine monitor (VMM) runtime integrity watcher is described. A set of one or more hardware range registers that protect a contiguous memory space that is to store the VMM runtime integrity watcher. The set of hardware range registers are to protect the VMM runtime integrity watcher from being modified when loaded into the contiguous memory space. The VMM runtime integrity watcher, when executed, performs an integrity check on a VMM during runtime of the VMM. Execution of the VMM runtime integrity watcher is triggered by a timer event generated based on multiple frequency bands.

17 Claims, 2 Drawing Sheets

TIMER FOR HARDWARE PROTECTION OF VIRTUAL MACHINE MONITOR RUNTIME INTEGRITY WATCHER

FIELD

This field of invention relates generally to computer processor architecture, and more specifically, to hardware protection of virtual machine monitor runtime integrity watcher software.

BACKGROUND

Consumers (and potential consumers) of cloud computing services have expressed reluctance to deploy sensitive data and workloads into cloud infrastructures due to concern about the infrastructure's ability to protect their sensitive information. In a cloud environment, this means providing adequate security for the virtualized environment.

For example, in a virtual environment (as most infrastructure as a service (IaaS) deployments are), it is the job of the virtual machine monitor (VMM) to provide security services to the virtual machines (VMs) it is managing. Accordingly, the VMM has a very high asset value since if it is compromised, then security of all the VMs (workloads) that it is monitoring is also compromised.

Technology exists, such as the Intel Trusted eXecution Technology (TXT), that ensures launch time integrity of a VMM. However, in a typical virtual IaaS environment, a launched VMM may keep running for over a month at a time, thereby increasing the vulnerability of this critical asset.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As detailed earlier, if a virtual machine monitor (VMM) is compromised, then security of all VMs (workloads) that the VMM is managing is also compromised. Embodiments described herein provide runtime integrity protection for the root VMM.

Figure 1:
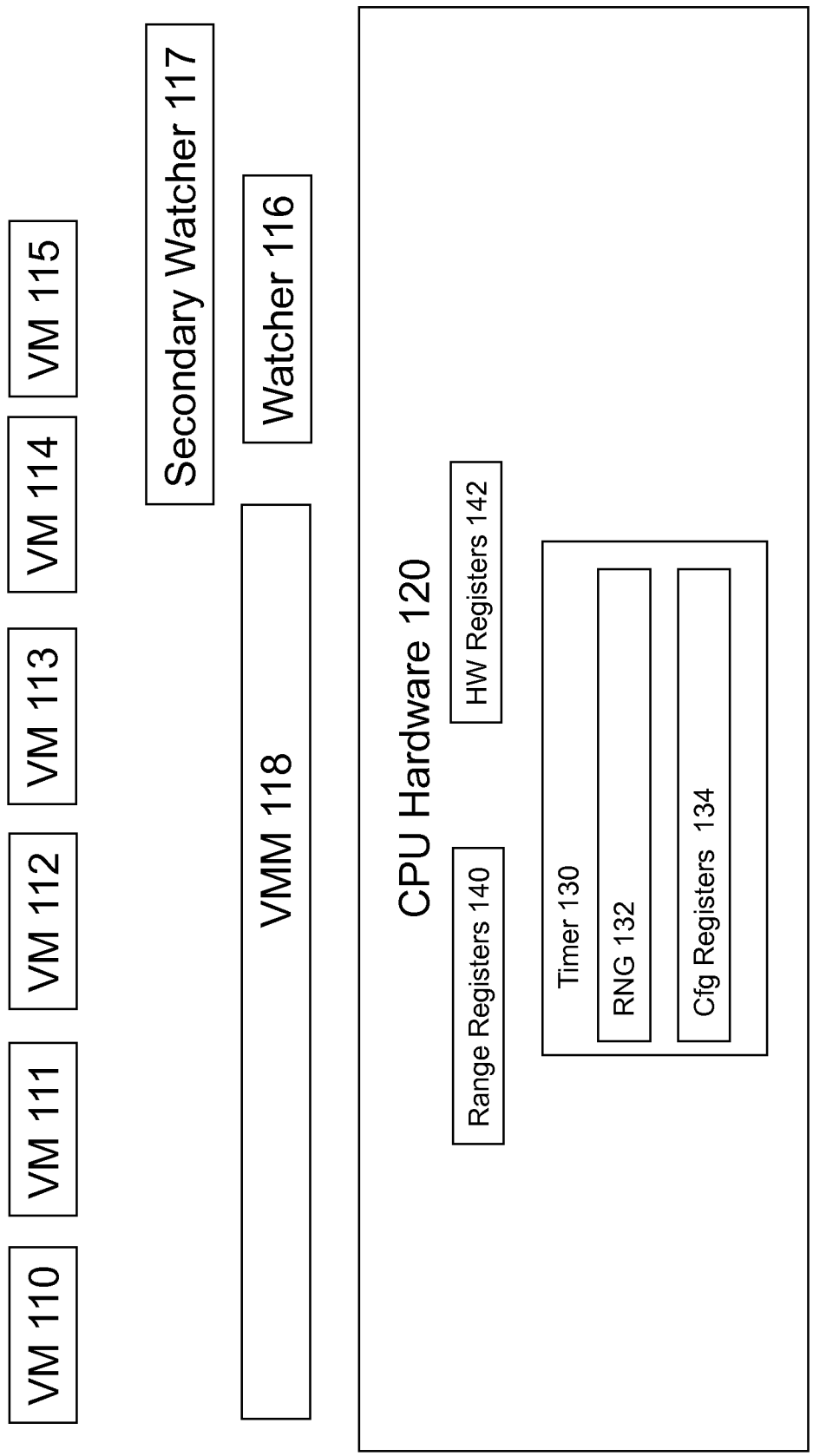
FIG. 1 illustrates an exemplary system for hardware protection of a virtual machine monitor runtime integrity watcher according to one embodiment.

FIG. 1 illustrates an exemplary system for hardware protection of a virtual machine monitor runtime integrity watcher according to one embodiment. The CPU hardware 120 includes the hardware necessary to execute the virtual machines (VMs) 110-114, the main VMM 118 and the main VMM runtime integrity watcher program 116 ("watcher"). The VMM 118 is the stand-alone root VMM that runs on the bare platform hardware and provides security services to the VMs 110-114 and is able to retain selective control of processor resources, physical memory, interrupt management, and data I/O provided through the CPU hardware 120 for the VMs 110-114.

The watcher 116 is a program that monitors the content and behavior of the main VMM 118 (e.g., to detect malware in the VMM 118 or other malicious software or behavior caused by such malware). In one embodiment, the watcher 116 is loaded into a hardware range register protected contiguous memory space from which it has visibility into the entire VMM's memory and resources. Thus, the watcher 116 may monitor the VMM's memory and resources. In one embodiment, hardware range register(s) 140 are defined that define the bounds of the memory address space where the code for the watcher 116 resides.

The hardware range register(s) 140 may be part of the processor core page management unit and work in conjunction with the memory management architecture of the processor. In one embodiment, the VMM 118 sets the values of the hardware range register(s) 140 when it launches and sets a lock bit, which prevents the values to be subsequently changed (unless a reboot occurs).

The hardware range register protected contiguous memory space prevents other entities on the platform, including the VMM 118, from modifying the watcher 116 or affecting its behavior. For example, the CPU hardware 120 sets an internal identifier inside the page management hardware as soon as the code transitions into the hardware range register protected contiguous memory space that is defined by the range registers (e.g., the execution of the watcher 116). This identifier indicates being in watcher mode. As will be described in greater detail later herein, execution of the watcher 116 will be triggered as a result of certain events occurring. Thus, the identifier is set only when the processor execution transfers control to the watcher 116. The identifier is reset when the processor execution transfers control back to the VMM 118.

For example, memory accesses made from the watcher 116 to any other memory space (excluding System Management Code space) is allowed by the page management hardware. For example, the page management unit consults the internal identifier to determine whether memory access is allowed. Access from code that is not executing in the space defined by the hardware range register(s) 140 into the space defined by the range register(s) 140 is directed into an abort page by the page management hardware unit. In such a case, for example, the code executing outside the space defined by the hardware range register(s) 140 will read all ones (0xff). By way of example, the VMM 118 is prevented from accessing the VMM integrity watcher 116 (e.g., prevented by the page management hardware unit). For example, if the identifier is not set, then the page management unit directs the request to an abort page. The VMM 118 should not be able to make a memory access when the identifier is set, since execution of the VMM 118 is preempted when the event is detected and control moves to the watcher 116.

In one embodiment, access to the memory space defined by the range register(s) 140 from code executing in System Management Mode is allowed. Thus, System Management Mode is treated as a supervisory mode and is allowed to access the watcher 116. The code executing in System Management Mode may be inside a Trusted Computing Base. System Management Mode may allow supervisory functions such as Reliability, Availability, and Serviceability (RAS) to be performed.

In one embodiment, the watcher 116 is executed due to a hardware guaranteed immutable triggering mechanism that invokes the execution of the watcher 116. For example, in one embodiment, a hardware timer 130 is used to generate a timer event that causes the execution of the VMM 118 to be preempted and control brought into the watcher 116 (which is loaded in the protected memory space). Timer events may be communicated securely and privately to VMM 118 and/or other software such as Integrity Measurement Software (IMS) using encryption and/or endpoint attestation and link shielding.

Design of the timer is based on several considerations. If the frequency of timer events is too high, performance may be affected. If the frequency of timer events is too low, an attack may take place between timer events. If the frequency of timer events is predictable, attacks might be synchronized to take place between timer events. Therefore, embodiments of the present invention may use a multi-frequency band, randomized timer.

For example, timer 130 may be programmed to generate timer events using four separate frequency bands. The timer may generate an event from one of the four bands according to a probability distribution, such that the number of events is distributed amongst the bands as desired. For example, 99.4% of events may be generated based on a frequency band with a period of 200 msec, 0.35% of events may be generated based on a frequency band with a period of 10 msec, 0.16% of events may be generated based on a frequency band with a period of 1 msec, and 0.09% of events may be generated based on a frequency band with a period of 0.3 msec. In this way, the frequency of events is more variable and less predictable, and not too high or too low. The selection of band may be based on a random number from random number generator 132 or other random number source, where the random number is used to select a band according to the desired probability distribution, then to select a random delay from within the selected band. Timer 130 may include programmable registers 134 to provide for configuration of the timer according to the desired probability distribution. In various embodiments, the probability distribution may be automatically or otherwise adjusted based on any desired factors, such as time of day, power requirements, etc. Any number of bands and any distribution among bands may be used within the scope of the present invention.

In other embodiments, the watcher 116 may also be invoked due to certain events (referred herein as "voluntary events") such as a bad I/O port and control register or machine specific register (MSR) execution, and control is brought to the watcher 116.

After the execution of the watcher 116 is invoked, it operates in the hardware protected region unaffected by malware and cryptographically verifies the integrity of the VMM 118. In one embodiment, the watcher 116 uses well known cryptographic algorithms (e.g., SHA-2) to compute hash(es) of portions of code and/or data during the first invocation (e.g., when the machine initially boots and performs the first invocation) and storing it in the hardware range register protected memory space. Then, upon subsequent invocations of the watcher 116 during the runtime of the VMM 118, the watcher 116 repeats the hashing operation on those portions of code and/or data to determine whether the hash values are the same. If they are the same, then integrity of the VMM 118 is not compromised. If they are different, then the integrity of the VMM 118 is compromised. In another embodiment, the hash value(s) of the VMM 118 is generated differently, for example during compilation (in such a case it may be signed).

In one embodiment, a secondary watcher program 117 is included within the VMM 118. The secondary watcher program 117 may be scattered throughout memory. The secondary watcher program 117 can run in VMM context. In addition, the secondary watcher program 117 can run with interrupts on. In embodiments where a secondary watcher program 117 is included within the VMM 118, the watcher program 116 verifies the integrity of the secondary watcher program 117 and then transfers responsibility of verifying the integrity of the VMM 118 either partially or fully to the secondary watcher.

In one embodiment, a set of hardware register(s) 142 of the CPU hardware 120 are used for a secure reporting mechanism to report findings of the watcher 116. In one embodiment, the set of hardware register(s) 142 can be only written by the watcher 116, but can be read by any other software entity. For example, a set of one or more uncore registers may be used for reporting. The set of uncore registers may be writable only by the watcher 116 but able to be read by any other software entity. For example, the set of uncore registers may only be written when in the watcher mode, as identified by the identifier previously described. Thus, if not in watcher mode, a write will not be allowed. When in watcher mode, only the watcher should be executing (since the VMM is preempted) and is allowed to write to the set of uncore registers. In an embodiment, the frequency of reporting may also be based on timer events from timer 130.

In another embodiment, the CPU hardware 120 may provide a secure pathway through other microcontroller(s) that are embedded inside the processor and/or chipset in order to export the report to a management entity (in addition to or in lieu of using the set of hardware register(s) 142 for reporting). Such a management entity may include, for example, a system management application or a cloud management application.

After reporting the results of the integrity check, execution of the watcher 116 exits and control is transferred back to the VMM 118 to resume its execution. By way of example, the watcher 116 issues an instruction architecture trigger (e.g., VMRESUME) instruction causing the VMM 118 to resume its execution.

Figure 2:
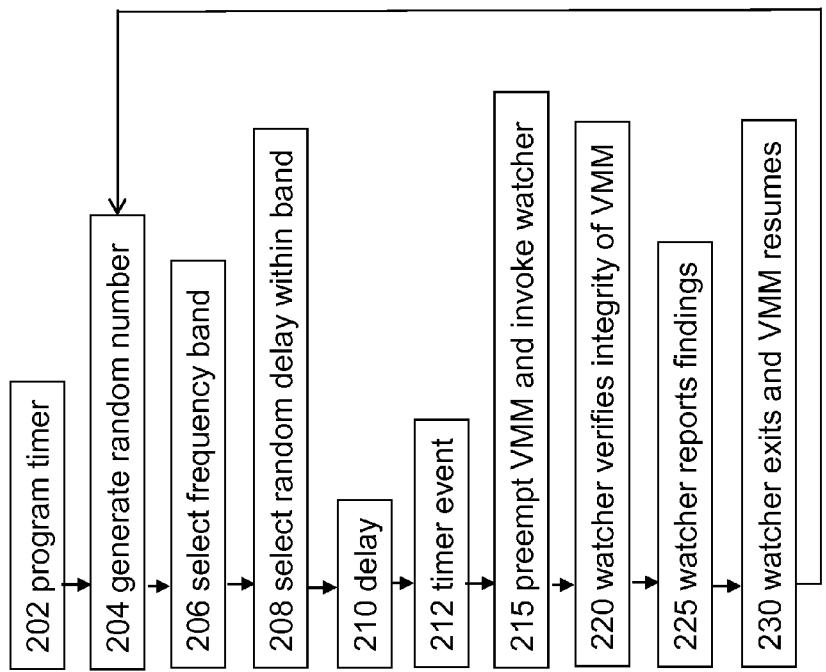
FIG. 2 is a flow diagram illustrating exemplary operations performed by a system providing hardware protection of a VMM runtime integrity checking application according to one embodiment.

FIG. 2 is a flow diagram illustrating exemplary operations performed by a system providing hardware protection of a VMM runtime integrity checking application according to one embodiment. FIG. 2 will be described with reference to the exemplary embodiment of FIG. 1. However, it should be understood that the operations described with reference to FIG. 2 can be performed by embodiments different than that described with reference to FIG. 1, and the embodiment described with respect to FIG. 1 can perform operations that are different than that are described with respect to FIG. 2.

At operation 202, timer 130 is programmed with a desired probability distribution amongst a number of frequency bands. At operation 204, a random number is generated. At operation 206, the random number is used to select one of a number of frequency bands according to the desired probability distribution. At operation 208, a delay value is randomly selected from within the selected frequency band. At operation 210, timer 130 waits for the selected delay. At operation 212, timer 130 generates an event to trigger the execution of the watcher 116.

At operation 215, the event causes the hardware 120 to preempt the execution of the VMM 118 and executes the watcher 116. For example, upon the event occurring, the chipset asserts a signal to cause the processor to enter watcher mode at the next instruction boundary. As previously described, in one embodiment the watcher 116 is loaded in a region of contiguous memory space that is protected via hardware range registers from being modified or its behavior affected (including by the VMM 118).

Flow then moves to operation 220, where the watcher 116 verifies the integrity of the VMM. For example, this may include the watcher 116 analyzing the cause of entry (e.g., the reason that it was executed) and generating cryptographic hash(es) of portions of code and/or data of the VMM 118 and comparing it to previously stored values.

In an embodiment where there is a single watcher (that is, in an embodiment where there is not a secondary watcher 117), the watcher 116 performs all analysis and may spend no more than 200 microseconds analyzing the cause of entry since interrupts are off.

In an embodiment where there is a secondary watcher 117 in addition to the watcher 116, the watcher 116 verifies the secondary watcher 117, which runs in VMM context. The secondary watcher 117 can run with the interrupts on. The secondary watcher 117 may either full, or partially, perform the responsibility of VMM malware checking.

Flow moves from operation 220 to operation 225. At operation 225, the watcher 116 reports its findings. For example, the watcher 116 writes to the register(s) 142 to indicate whether the integrity of the VMM 118 has been compromised. As another example, the watcher 116 may, in addition to or in lieu of writing to the register(s) 142, reports the findings (e.g., the status of the integrity of the VMM 118) to a management entity such as a system management application or a cloud management application. In such a case, the CPU hardware 120 may provide a secure pathway through microcontroller(s) that are embedded inside the processor and/or the chipset.

In an embodiment where there is a secondary watcher 117, the secondary watcher 117 returns its verification results to the primary watcher 116 and the primary watcher 116 reports the result as described above in one embodiment. In another embodiment, a signed report of the results from the secondary watcher 117 is produced using a platform based cryptographic hardware component (a Trusted Platform Module (TPM)).

In one embodiment, external server(s) (management console(s)) use the results of the integrity check. For example, the results written to the register(s) 142 may be exported by the chipset to management console(s), which may manage multiple servers. As another example, a signed report (signed using a TPM component) is exported to the management console(s). These management consoles may take action upon a determination that integrity was compromised. For example, they may cause the machine to shut down. As another example, they may cause a notification (e.g., email, text message, etc.) to be automatically generated and sent to an administrator and/or a phone call to be automatically placed to an administrator. The management consoles may generate forensic cookies or other log files that can later be used and analyzed by enforcement agencies.

Flow moves from operation 225 to operation 230, where the watcher 116 exits. For example, the watcher 116 issues a trigger to exit the watcher mode (e.g., a VMRESUME instruction), which will cause the VMM 118 to resume its execution. Flow then moves to operation 235 where the VMM 118 resumes its execution.

In another embodiment, the CPU hardware 120 may provide a secure pathway through other microcontroller(s) that are embedded inside the processor and/or chipset in order to export the report to a management entity (in addition to or in lieu of using the set of hardware register(s) 142 for reporting). Such a management entity may include, for example, a system management application or a cloud management application.

Thus, embodiments described herein describe the ability to check VMM integrity after the initial VMM has been loaded through a processor hardware driven run-time VMM integrity monitor (the watcher). As previously described, the check may be performed periodically and/or upon certain event(s) occurring, thereby providing ongoing assurance of VMM integrity. In addition, embodiments provide for a protected execution space for the run-time integrity checker described herein. Thus, the run-time integrity of VMM can be protected thereby resolving a security concern that exists today for deployment of virtualized servers in the cloud environment.

What is claimed is:

1. An apparatus, comprising:
a set of one or more hardware range registers to protect a contiguous memory space that is to store a virtual machine monitor (VMM) runtime integrity watcher, wherein the set of hardware range registers are to protect the VMM runtime integrity watcher from being modified when loaded into the contiguous memory space;
a timer to generate a timer event based on a frequency band selected from a plurality of frequency bands according to a probability distribution of desired number of events per frequency band; and
the VMM runtime integrity watcher to be invoked based on the timer event to perform an integrity check on a VMM during runtime of the VMM.

2. The apparatus of claim 1, wherein the selection of the frequency band from the plurality of frequency bands is based on a random number.

3. The apparatus of claim 2, wherein the timer event is generated after a delay randomly selected from the selected frequency band.

4. The apparatus of claim 1, wherein execution of the VMM is preempted upon the timer event being generated.

5. The apparatus of claim 1, wherein the VMM runtime integrity watcher is further to, when executed, report results of the integrity check.

6. The apparatus of claim 5, wherein the VMM runtime integrity watcher is to report results of the integrity check to one of a system management application and a cloud management application.

7. The apparatus of claim 5, further comprising:
a set of one or more hardware reporting registers; and
wherein the VMM runtime integrity watcher is to write to the set of hardware reporting registers to indicate whether the VMM has been compromised.

8. The apparatus of claim 7, wherein the set of hardware reporting registers are writable only by the VMM runtime integrity watcher and readable by any entity.

9. A computer-implemented method in a computing system, comprising:
loading a virtual machine monitor (VMM) runtime integrity watcher into a contiguous memory space of the computing system, wherein the contiguous memory space is protected by a set of one or more hardware range registers that protect the loaded VMM runtime integrity watcher from being modified;

generating a timer event to invoke execution of the VMM runtime integrity watcher, wherein the generation of the timer event is based on a frequency band selected from a plurality of frequency bands according to a probability distribution of desired number of events per frequency band;

responsive to the timer event, executing the VMM runtime integrity watcher; and performing, by the VMM runtime integrity watcher, an integrity check on a VMM during runtime of the VMM.

10. The computer-implemented method of claim 9, wherein the selection of the frequency hand from the plurality of frequency bands is based on a random number.

11. The computer-implemented method of claim 10, wherein the timer event is generated after a delay randomly selected from the selected frequency band.

12. The computer-implemented method of claim 9, further comprising, responsive to the timer event, preempting execution of the VMM.

13. The computer-implemented method of claim 9, further comprising:

reporting, by the VMM runtime integrity watcher, a result of the integrity check.

14. The computer-implemented method of claim 13, wherein reporting includes writing the result of the integrity check to a set of one or more hardware reporting registers.

15. The computer-implemented method of claim 13, wherein reporting includes reporting the result of the integrity check to one of a system management application and a cloud management application.

16. A system, comprising:

a virtual machine monitor (VMM); and a processor including a set of one or more hardware range registers to protect a contiguous memory space that is to store a VMM runtime integrity watcher, wherein the set of hardware range registers are to protect the VMM runtime integrity watcher from being modified when loaded into the contiguous memory space; and a timer to generate a timer event based on a frequency band selected from a plurality of frequency bands according to a probability distribution of desired number of events per frequency band;

the VMM runtime integrity watcher to be invoked based on the timer event to perform an integrity check on a VMM during runtime of the VMM.

17. The apparatus of claim 16, wherein the timer event is generated after a delay randomly selected from the selected frequency band.

* * * * *